Figure 3:
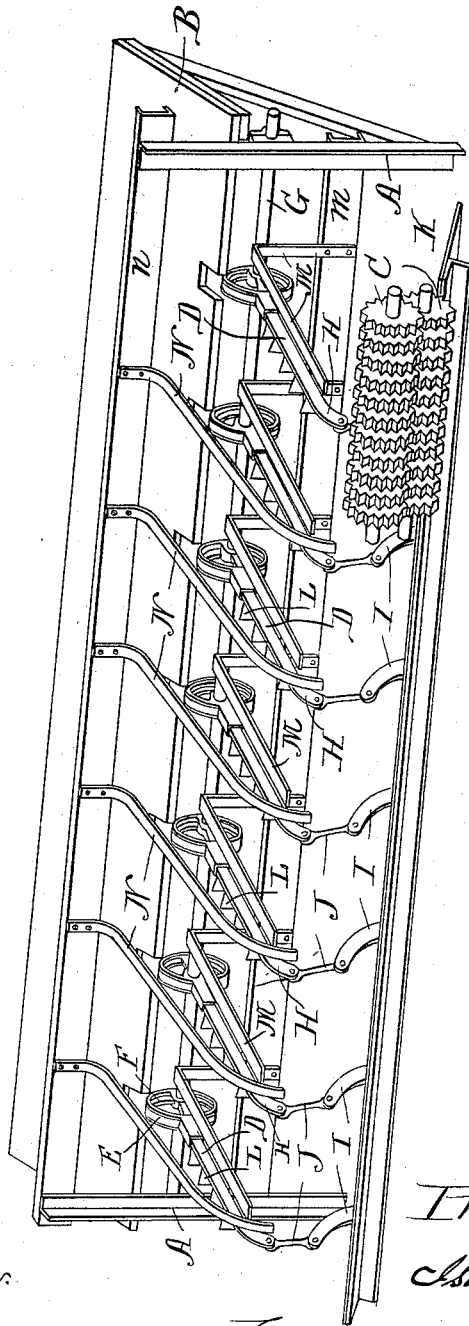

No. 610,713. Patented Sept. 13, 1898.
I. KORN.
CORN HUSKER.
(Application filed Nov. 4, 1897.)
(No Model.) 2 Sheets—Sheet 1.
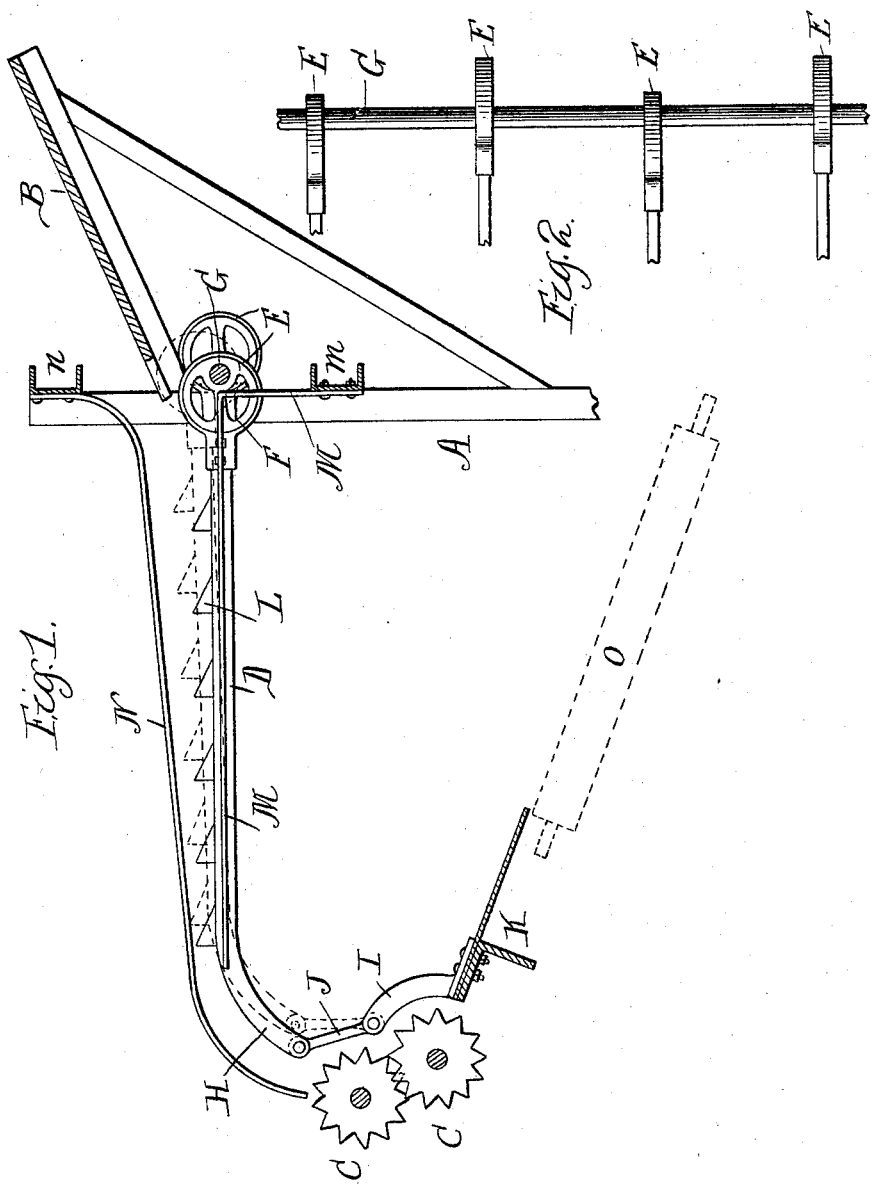
Witnesses.
Wm. M. Rheem.
Wm. O. Belt.
Inventor
Isaac Korn,
By Raymond & Anohundro,
Atty's No. 610,713. Patented Sept. 13, 1898.
I. KORN.
CORN HUSKER.
(Application filed Nov. 4, 1897.)

(No Model.) 2 Sheets—Sheet 2.

Witnesses. Inventor
Isaac Korn
by Raymond & Curshundred
att'ys

UNITED STATES PATENT OFFICE.

ISAAC KORN, OF STERLING, ILLINOIS, ASSIGNOR OF ONE-HALF TO SIMON S. CREIDER, OF SAME PLACE.

CORN-HUSKER.

SPECIFICATION forming part of Letters Patent No. 610,713, dated September 13, 1898.

Application filed November 4, 1897. Serial No. 657,334. (No model.)

*To all whom it may concern:*

Be it known that I, ISAAC KORN, a citizen of the United States, residing at Sterling, in the county of Whiteside and State of Illinois, have invented certain new and useful Improvements in Corn-Huskers, of which the following is a full, clear, and exact description, reference being had to the accompanying drawings, forming a part of this specification.

My invention relates to certain new and useful improvements in corn-huskers, and it has reference particularly to a feeding mechanism therefor.

One of the primary objects of my invention is to provide feeding mechanism for corn-huskers whereby a pile of stalks can be fed into said mechanism and the latter will agitate and separate the same, so that the stalks will be fed to the shredders in the most desirable manner for the shredding and snapping operations.

Another object of the invention is to provide means for agitating the stalks of corn as they are being fed to the shredders, so that the ears of corn in the husks on the stalks will be jostled into a position beneath the stalks so that when the latter reach the shredders and snappers the corn will be in a position where the shredders cannot cut the husks and injure the grains of corn.

Another object of the invention is to provide combined means for feeding stalks of corn to shredders and agitating the same by the feeding mechanism at the same time they are being carried forward to the shredders; and a further object of the invention is to provide means for pushing the stalks of corn against the shredders and holding the same in a position where the shredders will be sure to cut said stalks without injuring the grains of corn.

My invention also has other objects in view, which will be pointed out fully and clearly hereinafter in connection with the detailed description of the drawings, in which—

Figure 1 is a longitudinal sectional view of so much of a corn-husker as is necessary to illustrate the manner in which my improved feeding mechanism is embodied therewith, the feeding mechanism being shown in full lines in one position and in broken lines in another position. Fig. 2 is a detail view of the driving-shaft and the eccentrics thereon. Fig. 3 is a perspective view of the feeding mechanism.

It will be distinctly understood at the outset that my invention is not limited or restricted in its application to any particular form or style of corn-husker, for it may be used in a great variety of different kinds of machines of this character, and, indeed, it may be used as a feeding mechanism in other machines than corn-huskers with the same good results.

Referring to the drawings, in which like letters of reference denote corresponding parts in all the figures, A designates a portion of the frame of an ordinary corn-husker, and B the usual feed-table, which is inclined at a suitable angle to the feeding mechanism and shredders in the usual manner.

C are the shredding or snapping rolls, of any desired construction, the form shown being simply illustrative of one kind and of the relation which the shredders or snappers bear in position to the feeding mechanism.

The feeding mechanism proper consists of a number of eccentric-operated feed-bars D, each of said bars being provided with an eccentric strap or band E, which is arranged on an eccentric F, carried by the transverse shaft G, which is operated in some suitable manner. The forward end of each feed-bar is curved downwardly, as indicated at H, and pivotally connected to an arm I by means of a link J, said arm being secured on a transverse support K, secured in the frame of the machine. The feed-bars are provided with projections L on their upper sides, these projections being preferably of the form shown in the drawings, having an inclined upper side which starts from the body of the feed-bar and extends forwardly and up a suitable distance, the forward side of the projections being straight, so that the form of the projection as an entirety is substantially that of a right-angle triangle. There are a number of these projections on each feed-bar, and they are of such a size and shape as will best answer the purposes of the invention. It will be understood, of course, that each pair of feed-bars is secured on the driving-shaft G eccentrically with relation to each other, so that when one bar is up the other will be down, and as there are a number of these feed-bars, which number varies in accordance with the size of the machine, every alternate bar will be lifted while the others are depressed, as will be readily understood.

In order to prevent the stalks from falling below a certain horizontal plane in the machine, I provide the supporting-fingers M, which are secured to the frame at $m$, and to hold the stalks in place on the feeding mechanism I also provide the holding-fingers N, which are secured to the frame at $n$ and extend, preferably, entirely over the feeding mechanism and down to the shredders.

This being the general construction of my invention, the operation thereof will be readily understood. The corn is thrown upon the feed-table D in piles or bundles and is fed thereover and onto the feeding mechanism, which is being operated by means of the driving-shaft. The feed-bars move upward and forward and down, so that during one complete operation they will lift the stalks up and agitate them and carry them forward, so that the alternate feed-bars, which then engage the stalks, may carry them still farther. The operation of the feed-bars upon the stalks will result in such a separating and feeding of the stalks as to bring about the best results for the subsequent operation of snapping the ears from the stalk however the stalks may be fed into the machine. In some sizes of machines it is most advantageous to have the stalks fed into the machine in a position parallel to the axes of the snapping-rolls, and in other sizes of machines the stalks may be best fed into the machine butt foremost; but in machines designed for general use the stalks are thrown into the machine without any particular regard to their exact relation to the snapping-rolls, the feed-bar or agitator being relied upon to deliver them to the shredder in proper position, which is preferably butt foremost, this also being the preferable position in which to feed the stalks to the machine. This agitation of the stalks as they are being fed to the shredders will cause the ears in the husks to assume a position under the stalks so that when the stalks slide down over the curved ends H of the feed-bars and are forced into contact with the shredders these ears will be on that side of the stalks away from the shredders. The forward movement of the feed-bars carries the links J closer to the shredders, and in so doing these links force the stalks against the shredders to insure an engagement by the latter. As the shredders engage the stalks and cut the same into small pieces they do not engage the ears, which are snapped back onto the husking-rolls O, (indicated by dotted lines.)

The feeding and simultaneous agitation of the stalks is of especial importance, as it not only adjusts the stalks from a tangled mass into a separated condition in which the stalks are fed to the shredders in a substantially horizontal position, but it also brings the ears of corn into a position where they will not be engaged and injured by the shredders, so that they will be in the best possible position for being snapped back onto the husking-rolls.

I have shown in the drawings one embodiment of my invention; but it will be understood that I do not thereby limit myself to the particular form and details of construction shown and described, for many changes in the form and proportion of parts may be made without departing from the scope or sacrificing the advantages of my invention.

I have shown and described the projections L on the upper side of the feed-bars; but it will be understood that these projections may be placed on the under side of the feed-bars, so that the stalks will be fed from beneath the feed-bars, in which case a table will be arranged beneath the feeding devices, on which the stalks may rest. In this construction I contemplate feeding the stalks from the feed-table down to a supplemental table beneath the feeding devices, and the projections on the under side of the feed-bars will engage the stalks and feed them over this supporting-table in the same manner as hereinbefore described.

It is obvious that while I have described the invention as used in connection with a corn-husking machine, it may be adapted to threshing-machines and used in other relations without departing from the spirit of my invention.

Having thus fully described my invention, what I claim, and desire to secure by Letters Patent, is—

1. The combination with the shredders of a corn-husker, of a driving-shaft, eccentric-operated feed-bars connected to said shaft at their rear ends and provided with projections on their upper sides, a support and a link connection between said support and the forward ends of said feed-bars adapted to force the material against the shredders as the feed-bars are moved to a forward position, substantially as described.

2. The combination with the shredders of a corn-husker, of a driving-shaft, eccentric-operated feed-bars secured to said shaft at their rear ends and having their forward ends curved downwardly adjacent to the shredders, a support, arms secured to said support and extending upwardly behind the shredders, and a link pivotally connected to the down-turned forward end of each of the feed-bars and its corresponding arm and arranged to press the material against the shredders, substantially as described.

3. In a husking-machine, the combination with shredders and a driving-shaft, of eccentric-operated feed-bars connected to said shaft at their rear ends and having their forward ends downturned and pivotally supported in rear of, and adjacent to, the shredders, and supporting-fingers secured at their rear ends to the frame of the machine and arranged between the feed-bars, substantially as described.

ISAAC KORN.

Witnesses:
F. A. GOULD,
H. E. LLEWELLYNE.